METHOD AND MEANS FOR CONDITIONING GASES
Original Filed May 15, 1963
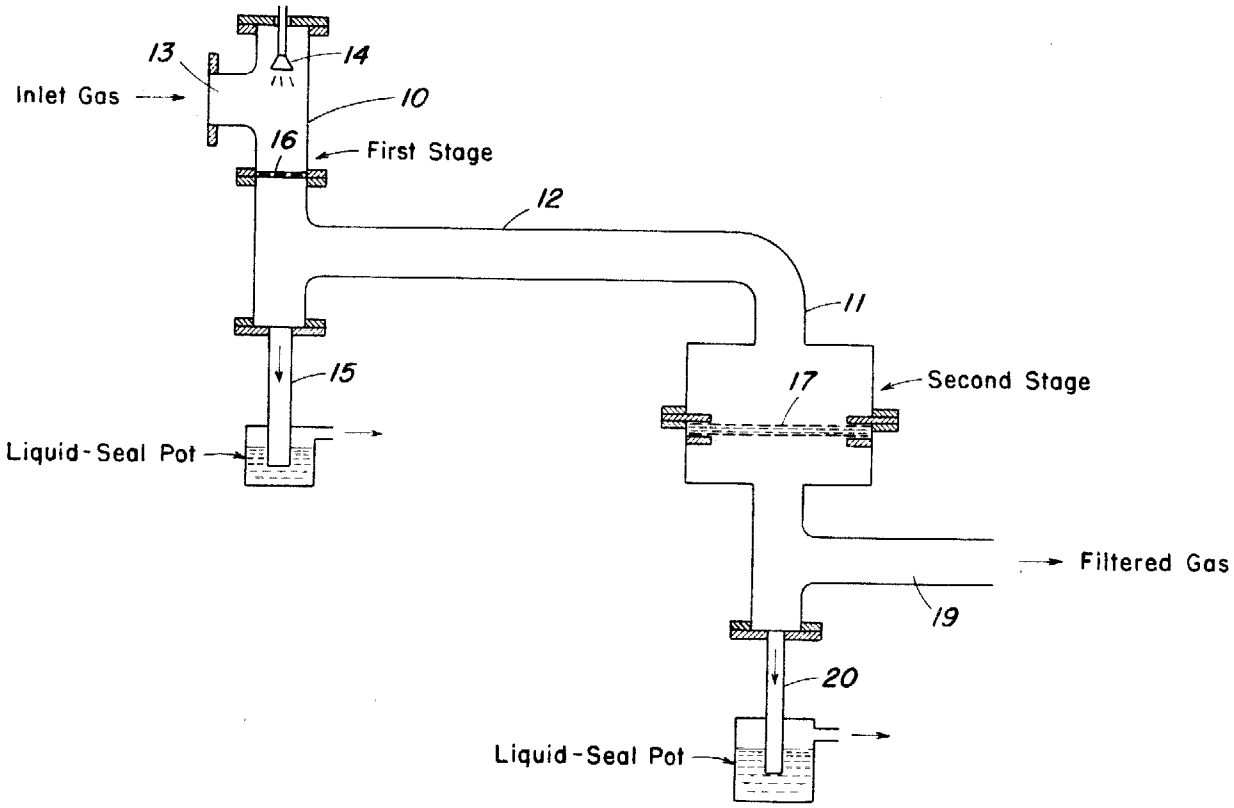
INVENTOR
William P. Vosseller
BY H. L. Gammons
AGENT United States Patent Office Re. 26,337
Reissued Jan. 23, 1968

26,337
METHOD AND MEANS FOR CONDITIONING GASES

William P. Vosseller, Spotswood, N.J., assignor to National Lead Company, New York, N.Y., a corporation of New Jersey Original No. 3,250,059, dated May 10, 1966, Ser. No. 280,690, May 15, 1963. Application for reissue Jan. 26, 1967, Ser. No. 620,552
6 Claims. (Cl. 55—90)

Matter enclosed in heavy brackets [ ] appears in the original patent but forms no part of this reissue specification; matter printed in italics indicates the additions made by reissue.

The present invention relates in general to conditioning gases and more especially to a method and means for removing aerosols and obnoxious gases from industrial waste gases.

Many devices have been employed heretofore for conditioning gases and in particular industrial waste gases against air pollution, as for example, electrostatic precipitators, absorption towers, spray towers, demister screens and the like, and while these have met with some success they nevertheless constitute, in most instances, an inordinately expensive capital investment and, in general, have a relatively short life due to corrosion and/or blinding. The latter malfunction is especially characteristic of present-day devices for conditioning gases containing appreciable amounts of submicron size solid particles sometimes referred to in the art as solid aerosols. In those instances in which the gases are to be used subsequently in auxiliary operations, it is of major importance that the solid aerosols be removed so as to obviate erosion and fouling of equipment, inefficient performance and the like. Similarly, if the gases are waste gases to be vented to the atmosphere it is essential that the solid aerosols be removed prior to conditioning the waste gases so as to prevent binding of filters, packed towers and similar conditioning equipment.

An object thereof of the present invention is to provide an economical and effective method for removing solid aerosols from gases containing aerosols and gaseous components.

A further object of the invention is to provide a relatively simple, inexpensive and efficient filtering system for removing solid and liquid aerosols and obnoxious gases from waste gases.

Another object of the invention is to provide an economical and effective filtering method and means for removing liquid and solid aerosols and obnoxious gases from waste gases emitted from digestion tanks, calciners, micronizer exhausts and the like, in the production of pigmentary titanium dioxide.

These and other objects, features and advantages of the invention will be described in more detail in the specification below and by the drawing in which is shown a schematic diagram of a filtering system used to illustrate the present invention.

In its broadest aspects the present invention is the discovery of a simple, economical and highly efficient method and means for conditioning gases containing solid aerosols by passing the gases through a filter of critical dimensions, from the upstream side thereof, thereby entrapping substantially all of the solid aerosols in the filter so as to separate these components from the gas stream; and washing the entrapped solid aerosols through the filter and out the downstream side thereof in a direction concurrently with that of the gas stream using as a washing agent a liquid in which said solid aerosols are insoluble.

The invention also contemplates a new and superior multi-stage filtering system employing multiple filters for conditioning industrial waste gases containing solid and liquid aerosols wherein the gases are passed through a first stage filter of critical dimensions in which substantially all of the solid aerosols are momentarily entrapped but subsequently washed therethrough as undissolved solids in a direction concurrent with the gas stream to separate the undissolved solid aerosols therefrom; and then through a second stage filter which removes virtually all of the liquid aerosols and certain of the more obnoxious gaseous components.

While it will be understood that the instant invention has other applications than the one herein described the particular problem to which the instant invention pertains and which serves to illustrate a specific application of the invention is that of removing aerosols and certain obnoxious gaseous components from the effluent gases discharged from kilns used to calcine $TiO_2$ hydrate material.

The calcination of titanium dioxide hydrate as normally carried out in the industry is performed in inclined rotating kilns, the titanium dioxide hydrate to be calcined being introduced into the upper end of the kiln and travelling slowly down the length of the kiln to the lower end from which it is discharged as calcined titanium dioxide pigment. During its passage through the kiln the titanium dioxide hydrate is calcined by a combustible fuel burning at the lower end of the kiln. During calcination gases are formed in the kiln in part, by combustion of the fuel and in part, by the evolution of water vapor and sulfur oxides from the titanium dioxide during its heat treatment.

A typical composition of calciner exhaust gases (before treatment) is given below.

TABLE I

ANALYSIS OF EFFLUENT GASES OF A $TiO_2$ CALCINER (CALCULATED FROM MATERIAL BALANCE)

| Materials: | Percent by volume |
|---|---|
| $N_2$ | 54.0 |
| $H_2O$ | 35.0 |
| $O_2$ | 7.0 |
| $CO_2$ | 4.0 |
| $SO_3+SO_2$ | 0.3 |
| $TiO_2$, (grains/d.s.c.f.) | 0.45 |

Heretofore it has been the practice to cool these effluent kiln gases, by passing them through a succession of spray towers and/or electrostatic precipitators, so as to remove the sulfur oxide components and in particular $H_2SO_4$ before exhausting the gases to the atmosphere. However the removal of the liquid aerosols, including liquid $H_2SO_4$ and water, formed as a result of cooling the kiln gases has been quite incomplete.

In carrying out the method of the present invention the effluent gases from a calciner are piped or otherwise conveyed into a multi-stage filtering system which, in essence, comprises two filtering areas or chambers arranged in sequence each provided with a filter arranged so that the gases will pass therethrough; and with means for spraying a liquid onto the upstream side of the first filter to wash the aerosols and gaseous components therethrough in a direction concurrent with the gas flow. Each filtering area or chamber is provided also with an outlet on the downstream side of its respective filter for draining off the liquids and/or solids-burdened liquids which collect on the downstream side thereof.

The specific details of the filtering system will depend of course upon the requirement of a particular installation and hence may be expected to vary while embodying the essential features of this invention.

The filters used in practicing the present invention may be in any suitable form, i.e., substantially flat pads, filter candles or a combination thereof, and are formed of a liquid repelling material and in particular hydrophobic fibers such as silicone-treated glass wool or preferably a synthetic, hydrophobic polyester fiber such as Dacron (polyethylene terephthalate), Terylene or the like. While the size of the fibers is not critical it is preferred to use fibers having a diameter less than about 30 microns.

Referring now to the drawing the latter shows, schematically, one relatively simple system which will serve to illustrate but not limit the invention; and which comprises in the main, a stack 10, a leg 11 and a connecting leader 12, the latter being connected at opposite ends respectively to the lower end of the stack 10 and the upper end of the leg 11. The stack 10 is the first stage of the filtering system and to this end is connected at inlet 13 to a source of waste gases, which source may be the exhaust pipe from a calciner or the exhaust pipe of a cooling tower or electrostatic precipitator interposed between the calciner and the filtering system. The top of the stack 10 is closed but provided with a pipe connection to a source of liquid supply for feeding a liquid to a spray-head 14 supported within the stack 10 above the inlet 13; while the bottom of the stack is provided with a drain pipe 15 for draining the solids-burdened liquid from the stack as hereinafter described. Supported in the stack 10 transversely thereof and substantially midway of its inlet 13 and the outlet to the leader 12 is first stage filter 16. With respect to the specifications of the filter 16 it has been discovered that the success of the instant invention, in its application to the removal of solid aerosols from the effluent waste gas depends in large measure upon the hydrophobic character of the filter material and its critical dimensions at predetermined densities. In practicing the present invention it has been discovered that for practical operating efficiencies and to avoid blinding, a first stage filter having a bulk density within the range of from about 2.0 to about 10.0 pounds per cubic foot should be less than about 0.2 inch thick. A first stage filter within this bulk density range and no more than 0.2 inch thick will remove 100% of the undissolved solid aerosols without creating undesirable pressure drops in the system. On the other hand a filter much more than 0.2 inch thick will offer excessive resistance to gas flow and be blinded by the undissolved solid aerosols after a few hours of operation; nor can permeability be restored by simple cleaning techniques. As for its minimum thickness the latter is limited largely by problems of fabrication and filters no thicker than 0.080 inch have been found to be highly effective in the removal of solid aerosols.

It will be understood however that the thickness range specified is for a filter having a bulk density within the range specified above; and that the optimum thickness of the filter will vary with different bulk densities. Thus, whereas a filter prepared from a polyester such as Dacron packed at a bulk density of 10 pounds per cubic foot requires a thickness of no more than 0.20 inch, a filter of the same material packed, at a bulk density of 1 pound per cubic foot would require a thickness considerably greater than 0.20 inch.

It will be further understood that the specific range in bulk densities is in reference to materials having about the same actual density as that of polyester fibers, namely about 1.4 to 1.5 grams per milliliter; and that a filter prepared from a material having a relatively low actual density will consequently demand a relatively low bulk density. For example, since the actual density of polypropylene is about ⅔ that of a polyester then the bulk density of a filter made from polypropylene fibers would be ⅔ that of the bulk density of a filter made from polyester fibers or from about 1.3 to 6.7 pounds per cubic foot.

With respect to the area of the first filter this should be such as to provide from 1.5 to 10.5 cubic feet of gas per second per square foot of filter area. During normal operations the first stage filter is flushed periodically or continuously, as the case may be, with a liquid which is not a solvent of the solid aerosols. Thus when removing solid aerosols in the form of minute solid particles of $TiO_2$ from a waste gas the flushing or washing liquid may be water, a weak acid, recycled flushing liquid, a dilute aqueous $TiO_2$ slurry or the like. However if the solid aerosols are of the kind that are soluble in water or weak acids then flushing liquids should be selected which will not dissolve the solid aerosols.

The flushing liquid is fed to the first stage filter from the upstream side thereof. Thus, as the waste gases pass through the first stage filter the solid aerosols, i.e., solid particles of sub-micron $TiO_2$, in particular, are collected and retained momentarily in the filter and hence are separated from the gas stream, but only to be picked up subsequently by the filter flushing liquid which washes the undissolved solid aerosols through the filter and out on the downstream side thereof.

As mentioned above the filter is adapted to be flushed, i.e., kept substantially free of the undissolved solid aerosols by spraying $H_2O$, a weak acid or similar flushing liquid over substantially the entire free area of the filter. Spraying may be intermittent or continuous. If done intermittently than the flow of liquid from the spray head 14 may be controlled by a solenoid valve and automatic timer. While intermittent spraying is effective in eliminating substantially all of the undissolved submicron particles of $TO_2$ from the first stage filter a continuous spray has been found to be even more effective since it may combine flushing with more extensive cooling of the waste gases. In this connection precooling the gases increases the solubility of some of the gaseous components, i.e., $SO_2$ and condenses out more of the liquid aerosols, i.e., $H_2SO_4$ so that both may be removed to a greater extent by the filtering action of the filters.

In the filter system of this invention the first stage filter described above has been found to be effective in the removal of substantially 100% of the solid aerosols and up to 97% of the liquid aerosols and certain of more obnoxious gaseous components. The removal of virtually all of the residual liquid aerosols and obnoxious gases may be effected by passing them through the second filter.

Referring again to the drawing the solids-laden liquid is exhausted from the downstream side of the first stage filter through the drain pipe 15. The solids-free waste gases leaving the downstream side of the first stage filter, and containing residual liquid aerosols, i.e., $H_2SO_4$, and obnoxious gases, i.e., $SO_2$, pass by way of the leader 12, to the leg 11 of the filtering system in which the second stage filter 17 is mounted. Since the gases are now free of solid particles of $TiO_2$, the critical filter specifications required to remove the solid aerosols no longer obtain. However experience has shown that removal of the residual liquid aerosols and obnoxious gases from the solids-free waste gases may be accomplished at optimum efficiencies by employing a second filter having a thickness within the range of from about 1.0 to 2.0 inches at a bulk density (in Dacron) of from about 5 to 14 pounds per cubic foot.

The second stage filter 17 is formed of a hydrophobic material similar to that of the first stage filter and, as is characteristic of hydrophobic filters of this design, residual liquid aerosol, i.e., $H_2SO_4$ and the gaseous components are collected as liquid droplets on the individual fibers of the filter and are thus separated from the waste gas which passes on through the second stage filter and escapes from the system via the exhaust pipe 19. The liquid droplets that accumulate in the second stage filter eventually migrate through the filter 17, without benefit of water spray, and drop, by gravity separation, from the downstream side of the filter 17 to the bottom of the leg 11 from which they are carried off by the drain pipe 20.

Overall removal of solid aerosols from effluent waste gases passed through the two-stage filtering system of this invention have been uniformly 100% while from 70–100% removal of liquid aerosols and from 60–100% of the more obnoxious gases can be expected.

The filtered effluent gases exhausted from the system are thus free of solid aerosols and virtually free of liquid aerosols as well as $SO_2$, and hence may be exhausted into the atmosphere without the hazard of air pollution; or may be passed directly into cooling equipment for cooling to lower temperatures without fouling the cooling equipment; or used in auxiliary operations without creating corrosion problems and the like.

As mentioned earlier the specific filtering system shown in the drawing is for illustrative purposes only and not limiting of the invention; and modification are contemplated within the scope of the invention wherein the filter areas may be in the form of plenum chambers of any suitable shape and the filters installed in positions other than horizontal provided however the gas is directed at substantially right angles thereto and the liquid spray strikes the upstream side of the first filter in a direction concurrent to the gas flow so as to effectively wash the undissolved solid aerosols therethrough.

In order to illustrate the invention further the following examples are given:

Example I

Using the two-stage filtering system shown in the drawing, calciner exhaust gases precooled in a spray to about 71° C. and having the following analysis based on a dry standard cubic foot of gas:

$TiO_2$, .06 grain; $H_2SO_4$ (aerosol), 0.77 grain, and $SO_2$ (gas) 0.93 grain were fed to the upstream side of the first stage filter at the rate of 45 c.m.f. at 80° C. The filter was formed of Dacron fiber, was 0.195 inch thick, has an area of 0.0872 square foot and a bulk density of 3.84 pound per cubic foot.

Water at a temperature of 25° C. was fed intermittently from the spray head 14 onto the upstream side of the first-stage filter at the rate of 0.95 g.p.m. for a two-minute period during a period of 15 minutes, the ratio of cubic feet of waste gas to gallons of water being 356:1. Under these conditions the pressure differential between the upstream and downstream sides of the filter was about 6.4 inchs of $H_2O$. At the end of 30 minutes 1350 cubic feet of waste gas had been fed through the first stage filter. The gases leaving the downstream side of the first stage filter analyzed as follows based on a dry standard cubic foot of gas (d.s.c.f.):

$TiO_2$ (none), $H_2SO_4$ (aerosol), 0.15 grain, and $SO_2$ 0.53 (gas) grain.

The gas from the first stage filter was then passed through the second stage filter which was also formed of Dacron fibers. In this instance the filter was 1.88 inches thick, had an area of 0.785 square foot and a bulk density of 5.45 pounds per cubic foot. At this stage the temperature of the gas was 59° C. and the pressure differential between opposite sides of the filter was 1.4 inches of $H_2O$. The gas leaving the downstream side of the second stage filter had the following analysis:

$H_2SO_4$ (aerosol), 0.064 grain (d.s.c.f.), and $SO_2$ (gas) 0.34 grain (d.s.c.f.).

It will be seen from the above example that by using a relatively thin first stage hydrophobic filter in combination with a realtively thick second stage hydrophobic filter substantially 100% of the solid aerosols and virtually all of the liquid aerosols and $SO_2$ gas are removed from the waste gas.

Examples II–IV

Additional runs were made, as outlined in Tables II and III below, using the two-stage filter system of Example I but with variations in the dimensions and bulk densities of the respective first and second stage filters, and in the flow rates of the effluent gases. Thus, in Example II, the dimensions of the filters were similar to those used in Example I but the flow rate of the waste gas was 18 cubic feet per minute at 81° C. and the water was sprayed continuously onto the first stage filter at the rate of 1.3 gallons per minute, the ratio of gas, in cubic feet to gallons of $H_2O$ spray being 14:1.

In Example III the thickness of the first filter was 0.135 inch, the free area was 0.197 square feet and the bulk density was 2.78 pounds per cubic foot; while the thickness of the second stage filter was 1.88 inches at a bulk density of 7.25 pounds per cubic foot. The waste gas used was the exhaust from an electrostatic precipitator interposed between a calciner and the filter system and had less objectional aerosols than a gas directly from a calciner. Hence, the spray rate was diminished accordingly.

Example IV is similar to Example III, except that both filters were considerably larger in area. Moreover, the first-stage filter was much thinner and more dense and the spray liquor used was recycled from that recovered following the first filter.

The specifications for these additional examples and the data collected are shown in Tables II and III below:

TABLE II

TWO-STAGE RETAINING-FILTER SYSTEM FOR EFFLUENT GASES USING LIQUID SPRAY ON FIRST STAGE

| Run No. | Ex. I | Ex. II | Ex. III | Ex. IV |
|---|---|---|---|---|
| No. 1 filter: | | | | |
| Area, ft.$^2$ | 0.0872 | .0872 | 0.197 | 0.785 |
| Thickness, inches | 0.195 | .195 | 0.135 | 0.080 |
| Bulk density, lb./ft.$^3$ | 3.84 | 3.84 | 2.78 | 9.4 |
| No. 2 filter: | | | | |
| Area, ft.$^2$ | 0.785 | 0.785 | 0.785 | 2.77 |
| Thickness, inches | 1.875 | 1.875 | 1.875 | 2.0 |
| Bulk density, lb./ft.$^3$ | 5.45 | 5.45 | 7.25 | 10.6 |
| Vapor flow: | | | | |
| Rate, CFM at 80° C. | 45 | 18 | 18 | 100 |
| Inlet temperature ° C. | 71 | 81 | 70 | 69 |
| Outlet temperature ° C. | 59 | 30 | 33 | 61 |
| Stage No. 1 rate F.P.S. at 80° C. | 8.6 | 3.7 | 1.5 | 2.1 |
| Stage No. 2 rate F.P.S. at 35° C. | 0.71 | 0.23 | 0.26 | 0.43 |
| Spray water: | | | | |
| Rate, g.p.m. | 0.95 | 1.3 | 0.2 | 0.42 |
| Inlet temperature, ° C. | 25 | 23 | 24 | [1] 58 |
| Temperature rise, ° C. | Unknown | 4 | 3 | Unknown |
| Ratio ft.$^3$ feed gas/gal. water | 356:1 | 14:1 | 90:1 | 238:1 |
| Intermittent or continuous | Int. | Cont. | Cont. | [2] Cont. |
| Pressure drops, inches of water: | | | | |
| Stage No. 1 | 6.4 | 9.3 | 5.6 | 5.0 |
| Stage No. 2 | 1.4 | 0.6 | 0.3 | 4.4 |

[1] Outlet temperature.
[2] With recirculation of spray liquor.

TABLE III

GAS ANALYSIS EXAMPLES I–IV

| Ex. | Stage | Gas components as grains of solid and liquid aerosols and gases/dry std. ft.$^3$ | | |
|---|---|---|---|---|
| | | $TiO_2$ (aerosol) | $H_2SO_4$ (aerosol) | $SO_2$ [1] (gas) |
| I | Entering | 0.06 | 0.77 | 0.93 |
| | Leaving 1st | 0.0000 | 0.15 | 0.53 |
| | Leaving 2d | 0.0000 | 0.064 | 0.34 |
| II | Entering | 0.29 | 1.1 | 1.4 |
| | Leaving 1st | 0.0000 | 0.038 | 0.41 |
| | Leaving 2d | 0.0000 | 0.004 | 0.25 |
| III | Entering | 0.0031 | 0.17 | 0.83 |
| | Leaving 1st | 0.0000 | 0.0067 | 0.16 |
| | Leaving 2d | 0.0000 | 0.0030 | 0.10 |
| IV | Entering | 0.0002 | 0.057 | ([2]) |
| | Leaving 1st | 0.0000 | 0.029 | ([2]) |
| | Leaving 2d | 0.0000 | 0.016 | ([2]) |

[1] Expressed as equivalent grains $H_2SO_4$.
[2] Not measured.

From the foregoing description and examples it is patent that the instant invention relates to the discovery of a relatively inexpensive, structurally simple and highly efficient filtering system adapted to remove solid and liquid aerosols as well as obnoxious gases from effluent waste gases; and is characterized by a first stage hydrophobic filter of critical thickness in combination with a liquid spray which is a non-solvent of the solid aerosols, for continuously or intermittently washing the entrapped undissolved solid aerosols and the liquid aerosols through and out of the first stage filter on the downstream side thereof; and a second stage hydrophobic filter designed to remove the residual liquid aerosols and gaseous components from the solids-free gases. The filtering system of this invention is not only highly effective in removing solid aerosols from gases but, for comparable performance, its economy of construction and operation far excels the electrostatic precipitators, absorption towers, spray towers, dimister and similar relatively expensive devices on the market. In addition, the filtering system of this invention not only filters but allows simultaneous cooling of the gases so that if desirable the filtered gases may be used in other equipment or operations without subjecting the latter to overheating, corrosion and similar undesirable effects.

The invention may be carried out in other specific ways than those herein set forth without departing from the spirit and essential characteristics of the invention and the present embodiments are therefore to be considered in all respects as illustrative and not restrictive, and all changes coming within the meaning and equivalency range of the appended claims are intended to be embraced therein.

I claim:

1. Method for conditioning industrial waste gases containing solid and liquid aerosols and gaseous components comprising in combination the steps of; passing said waste gases through the upstream side of a first stage hydrophobic filter having a thickness commensurate with substantially 100% entrapment of the solid aerosols in said waste gases without blinding, entrapping said solid aerosols in said first-stage filter thereby separating said solid aerosols from said waste gases, concurrently spraying a liquid which is a non-solvent of said solid aerosols, onto the upstream side of said first-stage filter in a direction concurrent with said gas flow to wash the undissolved solid aerosols through said first-stage filter and out on the downstream side thereof thereby freeing said gases of said solid aerosols, passing the gases which have been freed of said solid aerosols through the upstream side of a second stage hydrophobic filter having a thickness greater than that of said first stage filter, entrapping the liquid aerosols and gaseous components in said second-stage filter thereby converting said liquid aerosols and gaseous components to liquid droplets and removing said liquid droplets from said second-stage filter by gravity separation from the downstream side thereof thereby freeing said waste gases of said liquid aerosols and said gaseous components.

2. Method for conditioning industrial waste gases according to claim 1, wherein said solid aerosols comprise submicron particles of $TiO_2$, said liquid aerosols comprise $H_2SO_4$ and said gaseous components comprise $SO_2$.

3. A multi-stage filtering system for conditioning industrial waste gases containing solid and liquid aerosols and gaseous components comprising in combination; a first-stage filtering area, a first-stage hydrophobic filter in said filtering area, means arranged to feed said waste gases into said filtering area and through said first-stage filter from the upstream side thereof, said first-stage filter having a thickness not exceeding 0.2 inch for effecting substantially 100% entrapment in said first-stage filter of the solid aerosols in said waste gases without blinding, means constructed and arranged to feed a liquid which is a non-solvent of said solid aerosols to said first-stage filter from the upstream side thereof to wash the solid aerosols through said first-stage filter and out on the downstream side thereof, thereby freeing said waste gases of said aerosols, means arranged to discharge the solid aerosol-burdened liquid from said first-stage filtering area, a second-stage filtering area, a second-stage hydrophobic filter in said second-stage filtering area, conduit means connected between the downstream side of said first filtering area and said second filtering area for conveying the solids-free gases from said first-stage hydrophobic filter to the upstream side of said second-stage filter and through said second-stage filter, said second-stage filter having a thickness from 5 to 10 times that of said first stage filter for effecting entrapment of the liquid aerosols and a major portion of the gaseous components in the waste gases and conversion thereof to liquid droplets in said second-stage filter, thereby freeing said waste gases of said liquid aerosols and gaseous components, said liquid droplets being removed from said second-stage filter by gravity separation, and means arranged to collect and discharge said liquid droplets from said second filtering area.

4. A multi-stage filtering system for conditioning industrial waste gases according to claim 3, wherein the solid aerosols comprise submicron particles of $TiO_2$, said liquid aerosols comprise $H_2SO_4$, said gaseous components comprise $SO_2$, and the bulk density of said first-stage filter is in the range of from 2.0 to 10 pounds per cubic foot and the thickness of said first-stage filter is in the range of from 0.05 to 0.2 inch, and the bulk density of said second-stage filter is in the range of from 5.0 to 14.0 pounds per cubic foot and the thickness of said second stage filter is in the range of from 1.0 to 2.0 inches.

*5. In a method for removing solid and liquid aerosols from industrial gases by passing the said gases through a liquid irrigated hydrophobic filter pad the improvement comprising: providing a single hydrophobic filter pad having a thickness not exceeding 0.2 inch, intimately contacting said liquid and the aerosol burdened gases within said filter pad by flowing said aerosol burdened gases through said filter pad from the up-stream side thereof at a velocity sufficient to carry said solid aerosols into said filter pad but not through said filter pad thereby entrapping substantially all of the solid aerosols within said filter pad, and concurrently washing substantially all of the entrapped solid aerosols from said filter pad by irrigating said filter with a liquid introduced into said filter pad from the upstream side thereof and co-flowing with said gases at a rate to provide a gas: liquid ratio of at least 14:1 cubic feet gas per gallon of liquid.*

*6. In a method for removing solid and liquid aerosols from industrial gases by passing said gases through an irrigated hydrophobic filter the improvement comprising: providing a single hydrophobic non-metallic filter having a thickness in the range of from 0.08 inch to not more than 0.2 inch, and a bulk density of from 2 to 10 lbs. per cubic foot, flowing said gases through said filter at a velocity of from about 1.5 to about 8.6 feet per second thereby entrapping in said filter substantially all of the solids in said gases and concurrently washing substantially all of the entrapped solids from said filter by irrigating said filter with a liquid co-flowing with said gases at a rate to provide a gas: liquid ratio of from about 14:1 to 356:1 cubic feet of gas per gallon of liquid.*

References Cited

UNITED STATES PATENTS

| | | | |
|---|---|---|---|
| 3,022,859 | 2/1962 | Sexton | 55—90 |
| 3,036,417 | 5/1962 | Mare et al. | 55—90 X |
| 3,064,408 | 11/1962 | Erga et al. | 55—90 X |

FOREIGN PATENTS

| | | |
|---|---|---|
| 872,473 | 7/1961 | Great Britain. |

REUBEN FRIEDMAN, *Primary Examiner.*

J. ADEE, *Assistant Examiner.*